United States Patent [19]
Pinkerton et al.

[11] Patent Number: 5,929,548
[45] Date of Patent: Jul. 27, 1999

[54] HIGH INERTIA INDUCTOR-ALTERNATOR

[75] Inventors: Joseph F. Pinkerton, Austin; David B. Clifton, Leander, both of Tex.

[73] Assignee: Active Power, Inc., Austin, Tex.

[21] Appl. No.: 08/925,113

[22] Filed: Sep. 8, 1997

[51] Int. Cl.[6] .................................................. H02K 17/00
[52] U.S. Cl. ........................... 310/166; 310/74; 310/178; 310/179; 310/181; 310/203; 310/214; 310/216; 310/261
[58] Field of Search .............................. 310/74, 178, 179, 310/181, 203, 214, 216, 261, 166; 318/233

[56] References Cited

U.S. PATENT DOCUMENTS

| | | | |
|---|---|---|---|
| 900,839 | 10/1908 | Elsoff | 310/261 |
| 1,199,602 | 9/1916 | Parsons | 29/596 |
| 1,894,273 | 1/1933 | Hunziker | 310/261 |
| 2,285,233 | 6/1942 | Smith | 29/596 |
| 3,462,628 | 8/1969 | Klimmek et al. | 29/596 |
| 3,502,924 | 3/1970 | Staebler | 310/211 |
| 3,582,696 | 6/1971 | Rosenberry, Jr. | 310/61 |
| 3,663,848 | 5/1972 | Lehoczky | 310/90 |
| 4,024,628 | 5/1977 | Crites | 29/598 |
| 4,032,807 | 6/1977 | Richter | 310/178 |
| 4,136,296 | 1/1979 | Hickey | 310/269 |
| 4,159,434 | 6/1979 | Kalsi | 310/168 |
| 4,200,831 | 4/1980 | Weldon et al. | 322/8 |
| 4,282,451 | 8/1981 | Bratoljic | 310/262 |
| 4,587,450 | 5/1986 | Ozaki | 310/156 |
| 4,751,417 | 6/1988 | Krinickas, Jr. et al. | 310/211 |
| 4,916,346 | 4/1990 | Kliman | 310/216 |
| 5,001,378 | 3/1991 | Miller et al. | 310/178 |
| 5,049,771 | 9/1991 | Challita et al. | 310/219 |
| 5,130,593 | 7/1992 | Connell | 310/256 |
| 5,315,197 | 5/1994 | Meeks et al. | 310/90.5 |
| 5,418,415 | 5/1995 | Ishizaki | 310/162 |
| 5,703,421 | 12/1997 | Durkin | 310/61 |
| 5,731,645 | 3/1998 | Clifton et al. | 310/74 |

*Primary Examiner*—Elvin G. Enad
*Attorney, Agent, or Firm*—Fish & Neave; Robert W. Morris

[57] ABSTRACT

A high inertia inductor-alternator energy storage device provides backup energy in a simple, compact device. The inductor-alternator stores an acceptable level of energy via an improved rotor that provides a high level of rotational inertia. The improved rotor can be manufactured at a reduced cost due to reduced milling requirements. Moreover, the inductor-alternators of the present invention have reduced complexity and increased reliability as a result of the geometry of the improved rotor.

28 Claims, 9 Drawing Sheets

HIGH INERTIA INDUCTOR-ALTERNATOR

BACKGROUND OF THE INVENTION

This invention relates to inductor-alternators that are utilized as energy storage devices, and more particularly toward inductor-alternators having relatively high system inertia.

Conventional inductor-alternators typically utilize a rotor machined from a single piece of high-strength steel. However, the fabrication of these rotors is often an expensive, time-consuming process in that the rotor starts out as a steel cylinder that is machined to remove a substantial amount of material, leaving the rotor itself.

Another drawback of conventional inductor-alternator rotors is the fact that known inductor-alternator geometries are essentially low inertia configurations. Low inertia configurations often require the addition of a separate flywheel mass to increase the system inertia so that the system can store an acceptable amount of stored energy. The addition of the separate flywheel, however, also severely impacts the manufacturing costs of the system as well as overall system complexity and reliability.

In view of the foregoing, it is an object of this invention to provide an improved high inertia inductor-alternator.

It is also an object of the present invention to provide an improved inductor-alternator including a rotor that provides high inertia to the inductor-alternator.

It is a further object of the present invention to provide an improved inductor-alternator energy storage device that may be fabricated at reduced manufacturing costs.

It is an additional object of the present invention to provide an improved inductor-alternator energy storage device requiring a less complex design when compared to conventional inductor-alternator energy storage devices.

SUMMARY OF THE INVENTION

These and other objects of the invention are accomplished in accordance with the principles of the invention by providing various inductor-alternator energy storage devices. The preferred embodiments include a high inertia rotor that may be fabricated from a single piece of high-strength steel. The rotors are manufactured such that the inductor-alternator energy storage devices do not require any additional components (e.g., a separately attached flywheel) to obtain high system inertia. The high system inertia enables the inductor-alternator devices to operate at acceptable levels as energy storage devices.

A further advantage of the present invention is related to the overall physical geometry of the improved rotor. The improved inductor-alternator rotors of the present invention may be fabricated in a much easier and more cost effective manner than previously known inductor-alternators.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
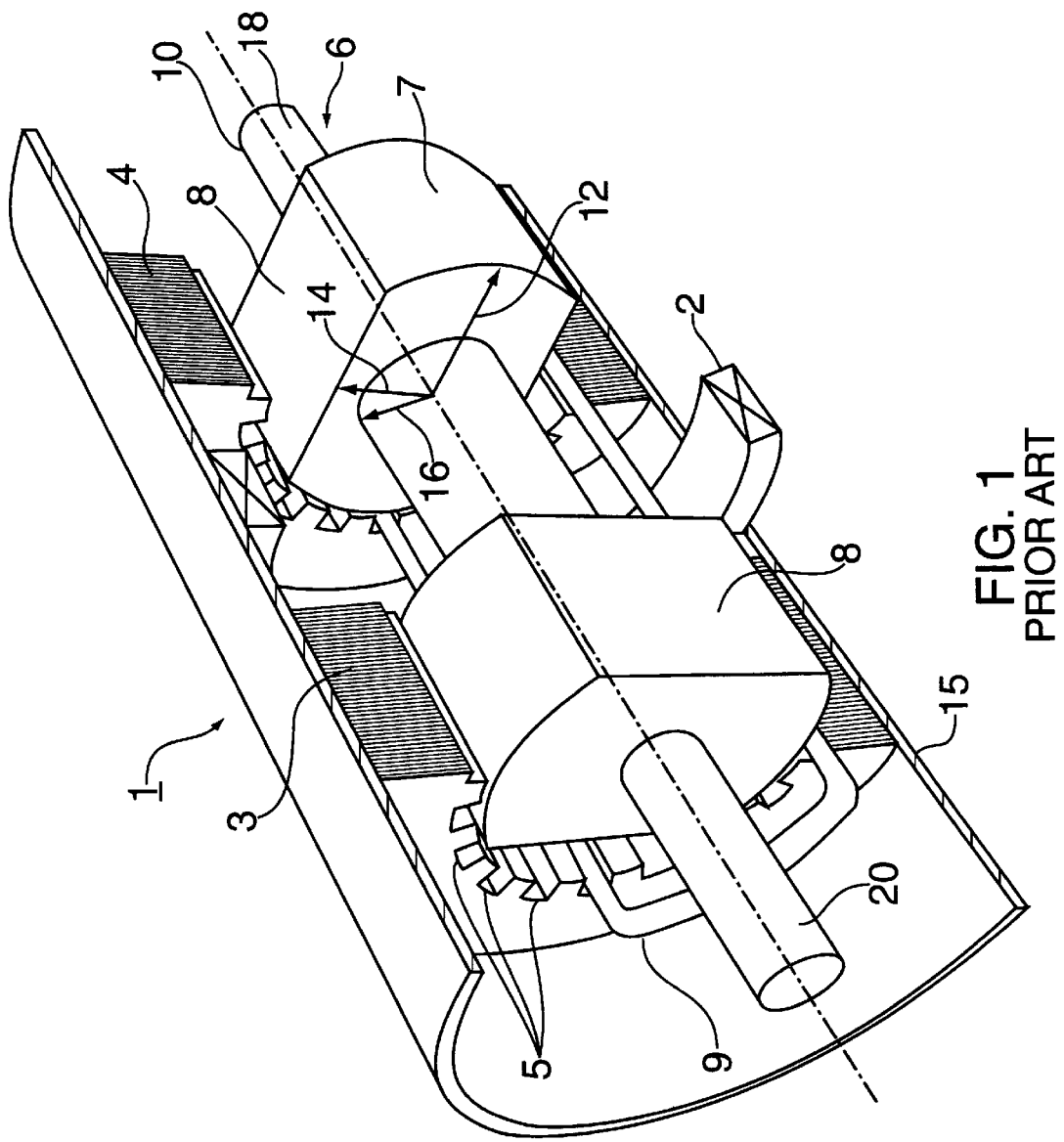
FIG. 1 is a cutaway perspective view of a conventional inductor-alternator.

FIG. 1 shows a conventional inductor-alternator device 1. Inductor-alternator 1 includes a stationary field coil 2 positioned between two stationary lamination stacks 3 and 4. Lamination stacks 3 and 4 have inner surface axial slots 5 that armature windings 9 are mounted within. An outer shell 15 (or back iron) that is typically a substantially solid piece of steel surrounds the stator assembly and provides a flux return path as is described below. Mounted within shell 15 is a rotor 6 that rotates freely about shaft 10. Rotor 6 is typically fabricated from a single cylinder of high-strength steel that is machined to form poles 7 extending radially from shaft 10 at each end of rotor 6. Rotor 6 is configured such that poles 7 are oriented to rotate within lamination stacks 3 and 4. As shown in FIG. 1, the poles may be oriented such that they are offset by 90 degrees.

Inductor-alternator 1 is operated by applying a direct current to field coil 2. The current drives a homopolar magnetic flux through one of lamination stacks 3 and 4 and into the corresponding poles of rotor 6. The magnetic flux is said to be homopolar because there are no flux reversals in individual laminated stacks 3 and 4 as rotor 6 rotates within shell 15. Upon entering rotor 6, the flux travels axially through rotor 6 until the other set of poles is reached. The flux then travels across the air gap between the rotating poles and into the other one of lamination stacks 3 and 4. After passing through the other lamination stack, the flux completes the magnetic circuit by traveling-through shell 15 until it completes a full closed loop. It should be noted that there are large magnetic slots 8 between the poles 7 of rotor 6. These slots interrupt the flow of the flux at the air gap causing the flux therein to vary with time. The time varying flux generates an AC voltage in armature windings 9, as is well known.

Rotor 6, however, does not provide an acceptable level of system inertia for energy storage applications due to its geometry. For example, in configurations such as that shown in FIG. 1, the maximum radius of rotor 6 (shown as arrow 12) is typically more than 50% greater than the rotor gullet radius (shown by arrow 14). Moreover, maximum radius 12 is typically more than twice the radius of shaft 10 (shown by arrow 16), while outer shaft segments 18 and 20 are typically more than twice as long as radius 12. This geometry results in a rotor having a relatively low inertia.

Figure 2:
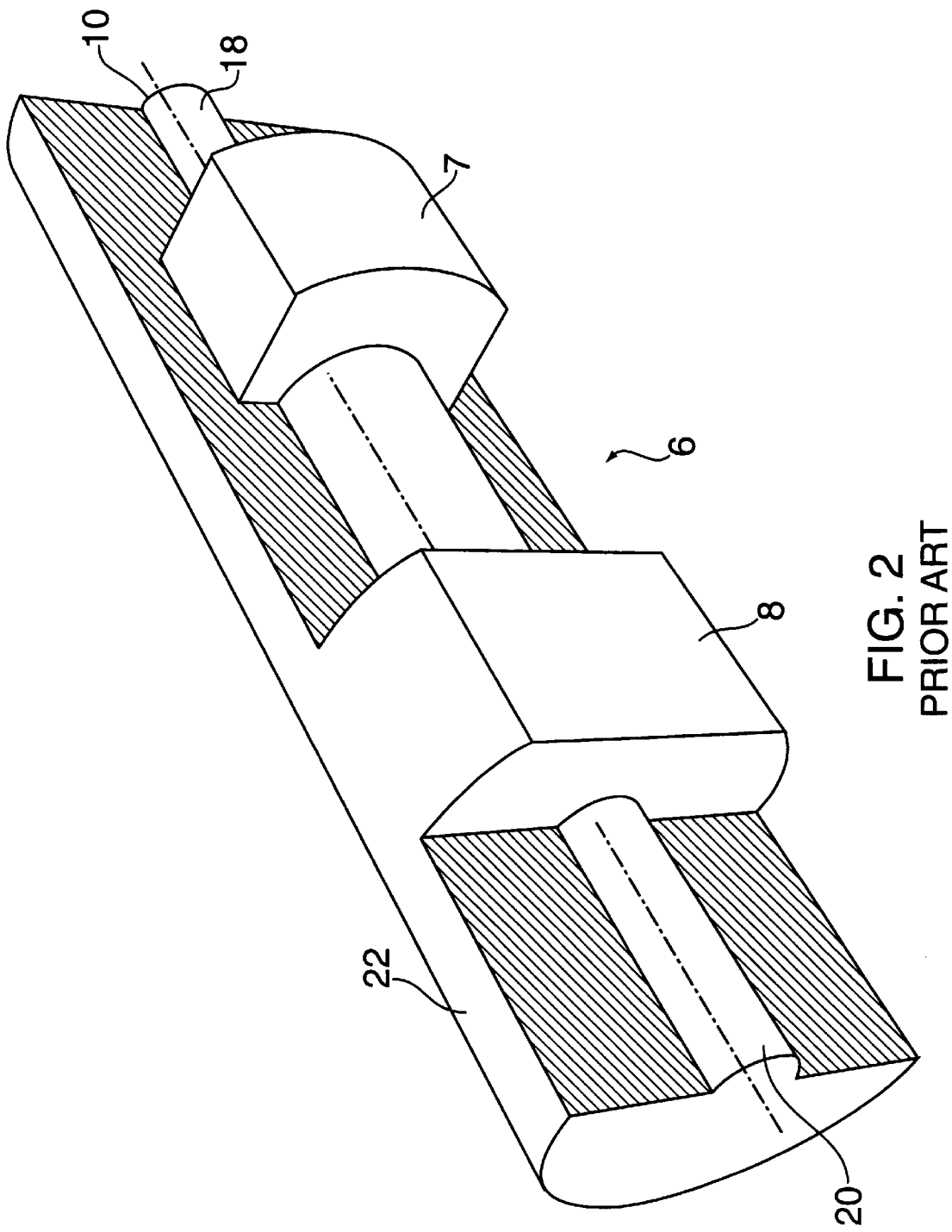
FIG. 2 is a cutaway perspective view of a conventional rotor in the middle of machining for the inductor-alternator of FIG. 1.

FIG. 2 shows a typical rotor 6 in the middle of the fabrication process. As can been seen in FIG. 2, the overall geometry of rotor 6 requires that a significant amount of high-strength steel be machined away from cylinder blank 22 that is used in manufacturing rotor 6. The significant machining required results in high manufacturing costs because of all of the metal that must be milled, as well as the additional time required to mill blanks 22.

Figure 3:
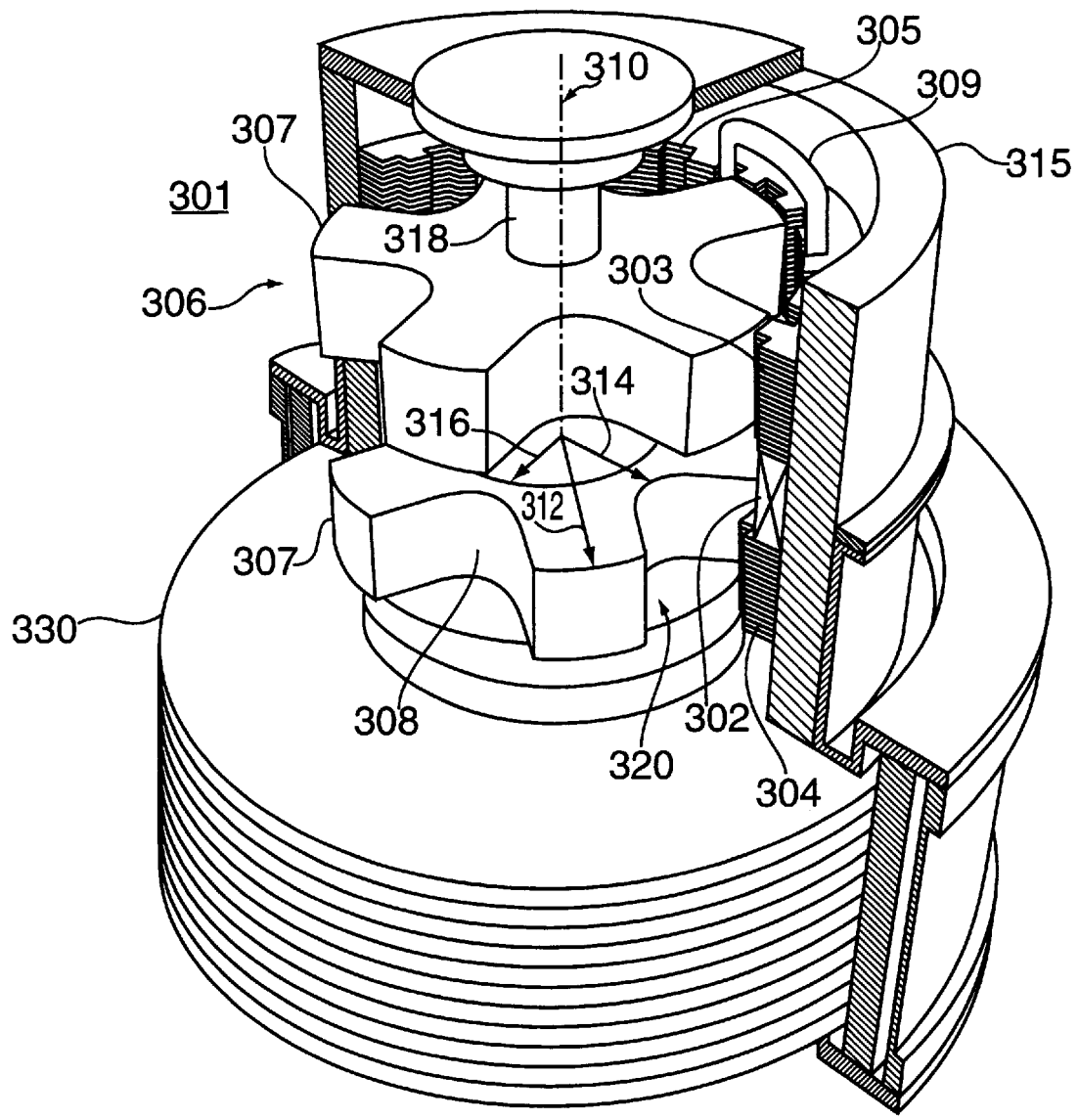
FIG. 3 is a cutaway perspective view of a conventional inductor-alternator having a separate flywheel rotor.

Referring to FIG. 3, another conventional inductor-alternator 301 is shown. Inductor-alternator 301 includes a stationary field coil 302 positioned between two stationary lamination stacks 303 and 304. Lamination stacks 303 and 304 have inner surface axial slots 305 that armature windings 309 are mounted within. An outer shell 315 (or back iron) that is typically a substantially solid piece of steel surrounds the stator assembly and provides a flux return path as is described below. Mounted within shell 315 is a rotor 306 that rotates freely about shaft 310 (generally indicated at the axis of shaft 310). Rotor 306 is typically fabricated from a single cylinder of high-strength steel that is machined to form poles 307 extending radially from shaft 310 at each end of rotor 306. Rotor 306 is configured such that poles 307 are oriented to rotate within lamination stacks 303 and 304.

Inductor-alternator 301 is operated in basically the same manner as described above for inductor-alternator 1 by applying a direct current to field coil 2. The current drives a homopolar magnetic flux through one of lamination stacks 303 and 304 and into the corresponding poles of rotor 306. Upon entering rotor 306, the flux travels axially through rotor 306 until the other set of poles is reached. The flux then travels across the air gap between the rotating poles and into the other one of lamination stacks 303 and 304. After passing through the other lamination stack, the flux completes the magnetic circuit by traveling through shell 315 until it completes a full closed loop. It should be noted that there are large magnetic slots 308 between the poles 307 of rotor 306. These slots interrupt the flow of the flux at the air gap causing the flux therein to vary with time. The time varying flux generates an AC voltage in armature windings 309, as is well known.

Unlike rotor 6 of FIG. 1, rotor 306 of FIG. 3 provides an acceptable level of system inertia for energy storage applications due to the addition of separate flywheel 330. However, as can be clearly seen in FIG. 3, flywheel 330 also significantly increases the complexity and size of inductor-alternator 301 and thereby also increase manufacturing costs and time. For example, rather than the simple pipe structure of shell 15, shell 315 requires a complex assembly due to flywheel 330. In addition, rotor 306 still has the same basic limitations in geometry as described above with respect to rotor 6. For example, the maximum radius of rotor 306 (shown as arrow 312) is typically more than 50% greater than the rotor gullet radius (shown by arrow 314), while also being typically more than twice the radius of shaft 310 (shown by arrow 316). Moreover, outer shaft segments 318 and 320 (as generally indicated by reference 320) are typically almost as long as radius 312. This geometry results in the rotor itself having a relatively low inertia.

Figure 4:
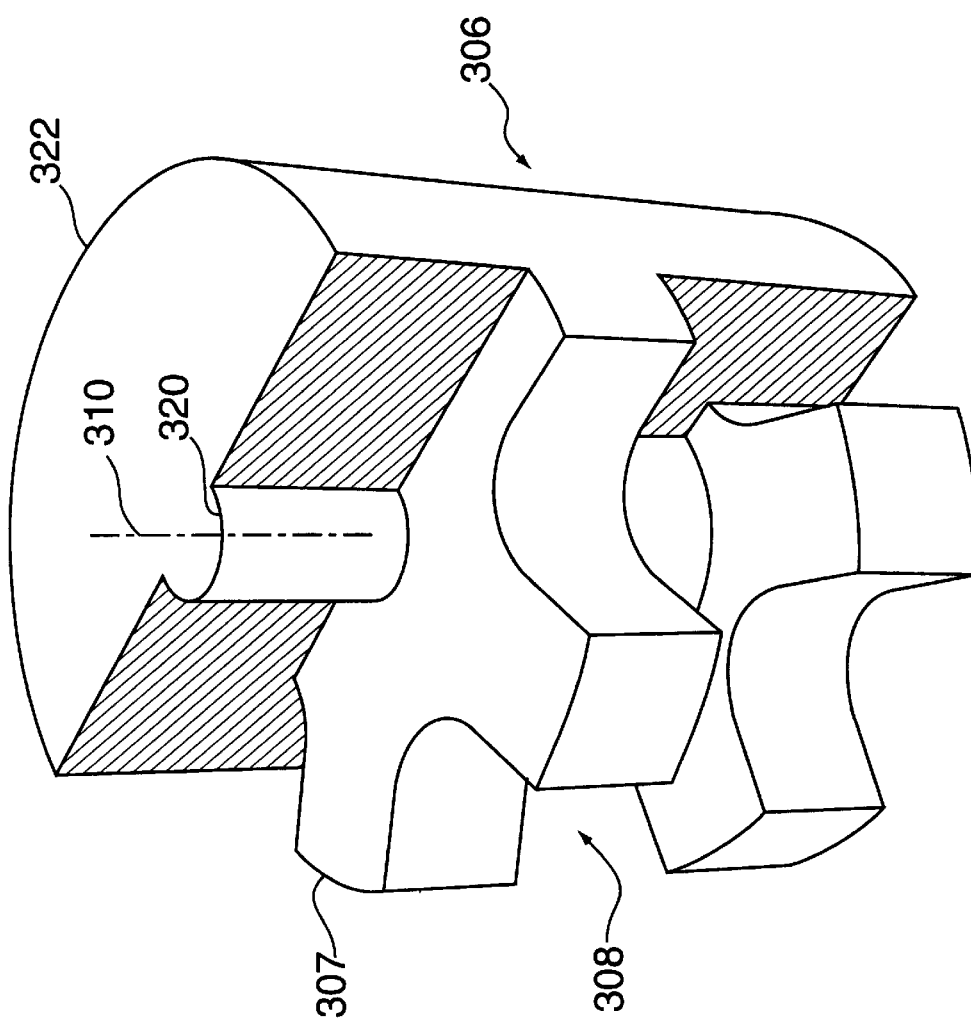
FIG. 4 is a cutaway perspective view of an alternate conventional rotor in the middle of machining for the inductor-alternator of FIG. 3.

FIG. 4 shows a typical rotor 306 in the middle of the fabrication process. As can been seen in FIG. 4, the overall geometry of rotor 306 also requires that a significant amount of high-strength steel be machined away from cylinder blank 322 that is used in manufacturing rotor 306. The significant machining required results in high manufacturing costs because of all of the metal that must be milled, as well as the additional time required to mill blanks 322.

Figure 5:
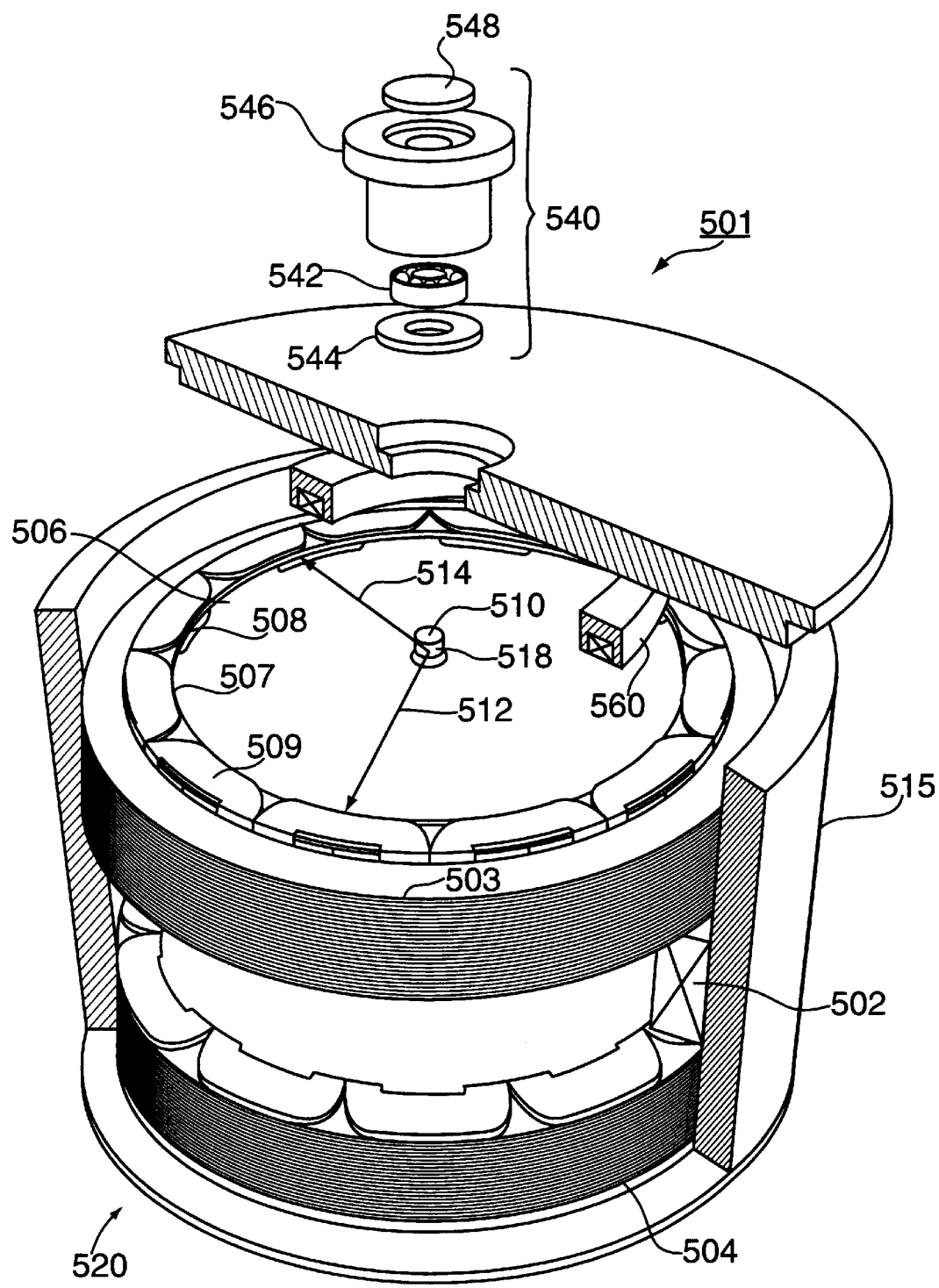
FIG. 5 is a cutaway perspective view of an inductor-alternator constructed in accordance with the principles of the present invention.
Figure 6:
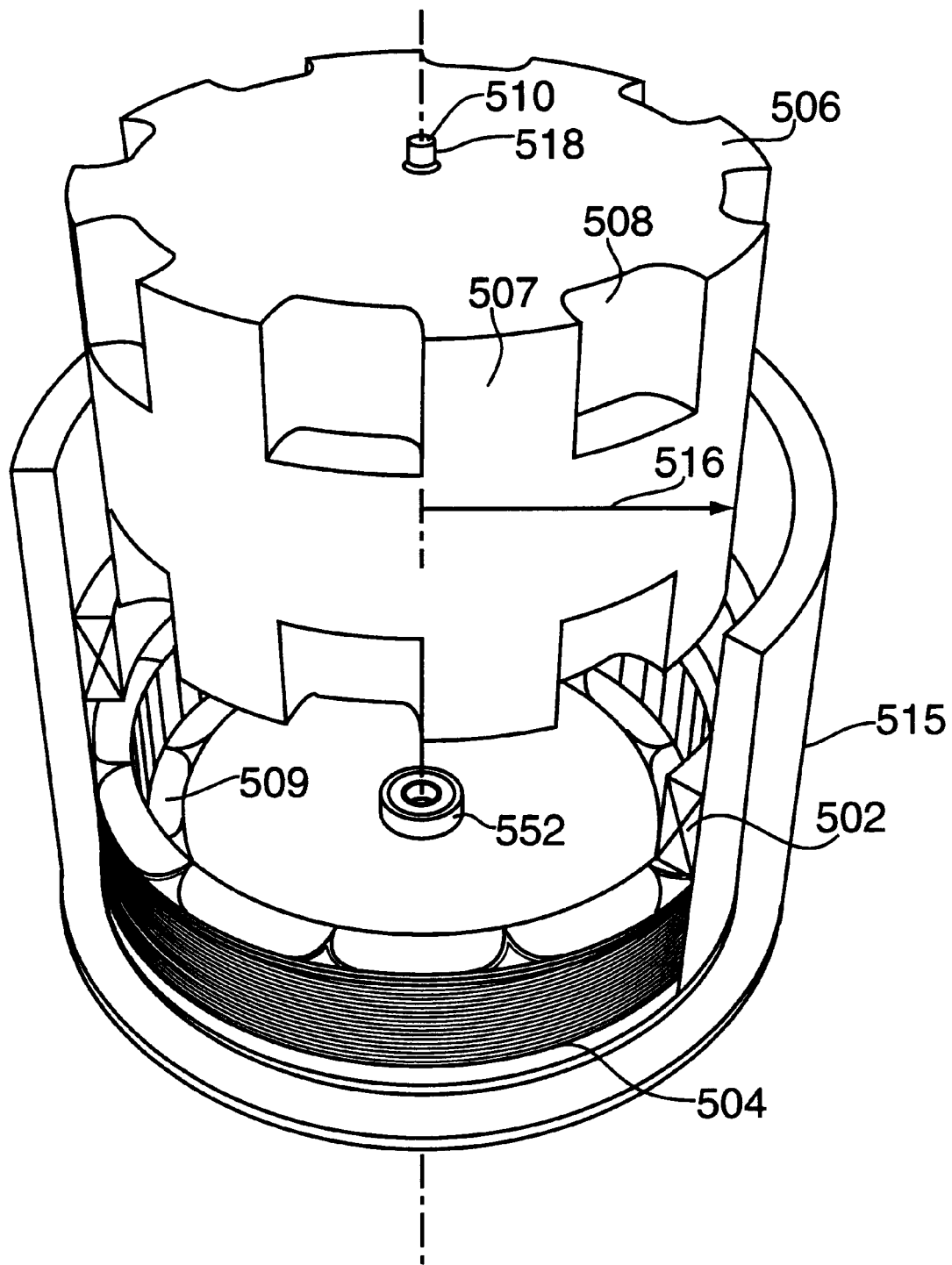
FIG. 6 is a cutaway perspective view of the inductor-alternator of FIG. 5 in a partially disassembled state showing the geometry of the rotor.

FIGS. 5 and 6 show an inductor-alternator device 501 constructed in accordance with the principles of the present invention (FIG. 6 shows device 501 in a partially disassembled state for clarity). Inductor-alternator 501 includes a stationary field coil 502 positioned between two stationary smooth rings 503 and 504 (rings 503 and 504 may be formed from material such as laminated stacks of rings or arcs segments of high permeability material such as powdered iron or steel, alternatively, rings 503 and 504 may be formed from a solid high permeability material such as ferrite, or any other suitable material).

Rings 503 and 504, contrary to the previously described lamination stacks (e.g., stacks 3, 4, 303 and 304) do not have inner surface axial slots for mounting the armature windings. Instead, armature coils 509 are formed such that they may be mounted against rings 503 and 504. Armature coils 509 are preferably airgap coils that are formed of substantially low permeability material. While the inner surface of rings 503 and 504 is shown to be smooth and slotfree, and airgap armature coils are preferred, persons skilled in the art will appreciate that the inner surface of rings 503 and 504 may be slotted and that armature coils 509 may be wound within those slots without departing from the scope of the present invention. An outer shell 515 (or back iron) that is typically a substantially solid piece of steel surrounds the stator assembly and provides a flux return path as is described below.

Mounted within shell 515 is a rotor 506 that rotates freely about shaft 510. Rotor 506 is typically fabricated from a single cylinder of high-strength steel that is machined to form poles 507 extending radially from shaft 510 at each end of rotor 506. Rotor 506 is Configured such that poles 507 are oriented to rotate within rings 503 and 504. While rotor 506 may be mounted within shell 515 in any manner, it may be preferred to mount rotor 506 within shell 515 utilizing a replaceable bearing cartridge 540 (containing bearing 542, bushing 544, bearing housing 546 and end cap 548). Additionally, electromagnet 560 (shown above rotor 506) may be utilized to remove a majority of the weight of rotor 506 from the mechanical bearings (i.e., bearings 542 and 552—see FIG. 6) during normal operation. This would extend the reliability and useful life of mechanical bearings 542 and 552. Moreover, the use of electromagnet 560 minimizes the size requirements of the mechanical bearings, and therefore, the end portions of shaft 510 may be smaller than in known inductor-alternators (the end portions may also be smaller in accordance with the present invention because there is no separate flywheel hanging from the bottom of the device).

Inductor-alternator 501 is operated in a manner similar to those described above by applying a direct current to field coil 502. The current drives a homopolar magnetic flux through one of rings 503 and 504 and into the corresponding poles of rotor 506. Upon entering rotor 506, the flux travels axially through rotor 506 until the other set of poles is reached. The flux then travels across the air gap between the rotating poles and into the other one of rings 503 and 504. After passing through the other lamination stack, the flux completes the magnetic circuit by traveling through shell 515 until it completes a full closed loop. It should be noted that there are gullets 508 between the poles 507 of rotor 506. These slots interrupt the flow of the flux at the air gap causing the flux therein to vary with time. The time varying flux induces an AC voltage in armature windings 509.

Rotor 506, unlike the previously described rotors (i.e., rotors 6 and 306), provides high system inertia such that inductor-alternator 506 may be utilized for energy storage applications without requiring any additional components. Rotor 506 provides high system inertia due to its improved geometry compared to known inductor-alternators. For example, unlike the previous rotors, the gullet radius of rotor 506 (shown at arrow 514) is at least 75%, and preferrably at least 85%, of the maximum radius of rotor 506 (shown at arrow 512), and the inner shaft radius (see reference numeral 516 on FIG. 6) is equal to maximum radius 512. While the inner shaft radius is shown to be equal to the maximum radius of rotor 506, persons skilled in the art will appreciate that the high inertia advantages of the present invention still will be obtained as long as the inner shaft radius is at least 75% of the maximum radius. In fact, the inner radius may be extended to beyond 100% of the maximum radius without departing from the spirit of the present invention. Additionally, outer shafts 518 and 520 are less than one third the axial length of maximum radius 512. The geometry of rotor 506 results in a relatively high rotational inertia when compared to previously known inductor-alternator rotors.

Figure 7:
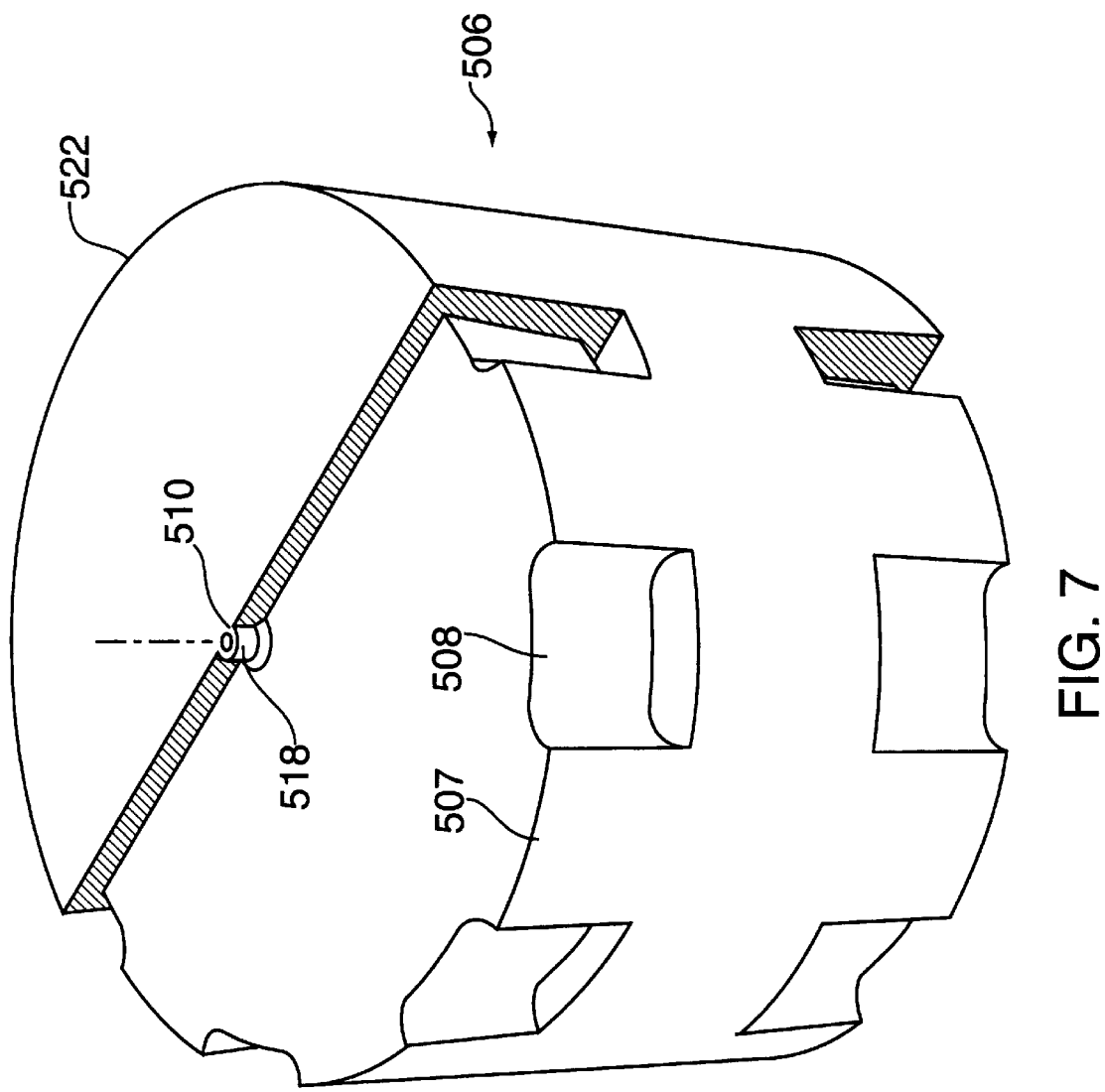
FIG. 7 is a cutaway perspective view of a rotor in the middle of machining for the inductor-alternator of FIG. 5 in accordance with the principles of the present invention.

Other advantages of the present invention are apparent from FIG. 7 that shows a rotor 506 in the middle of the fabrication process. As can been seen in FIG. 7, the overall geometry of rotor 506 requires that only a minimal amount of high-strength steel be machined away from cylinder blank 522 that is used in manufacturing rotor 506. For example, unlike the previously described rotors, rotor 506 does not require any milling to form the inner shaft and the outer shafts 518 and 520 are significantly shorter than the shafts on conventional rotors so that they also require significantly less machining from cylindrical blank 522. The reduced machining requirements result in significantly lower manufacturing costs because of the small quantity of metal that must be milled.

Figure 8:
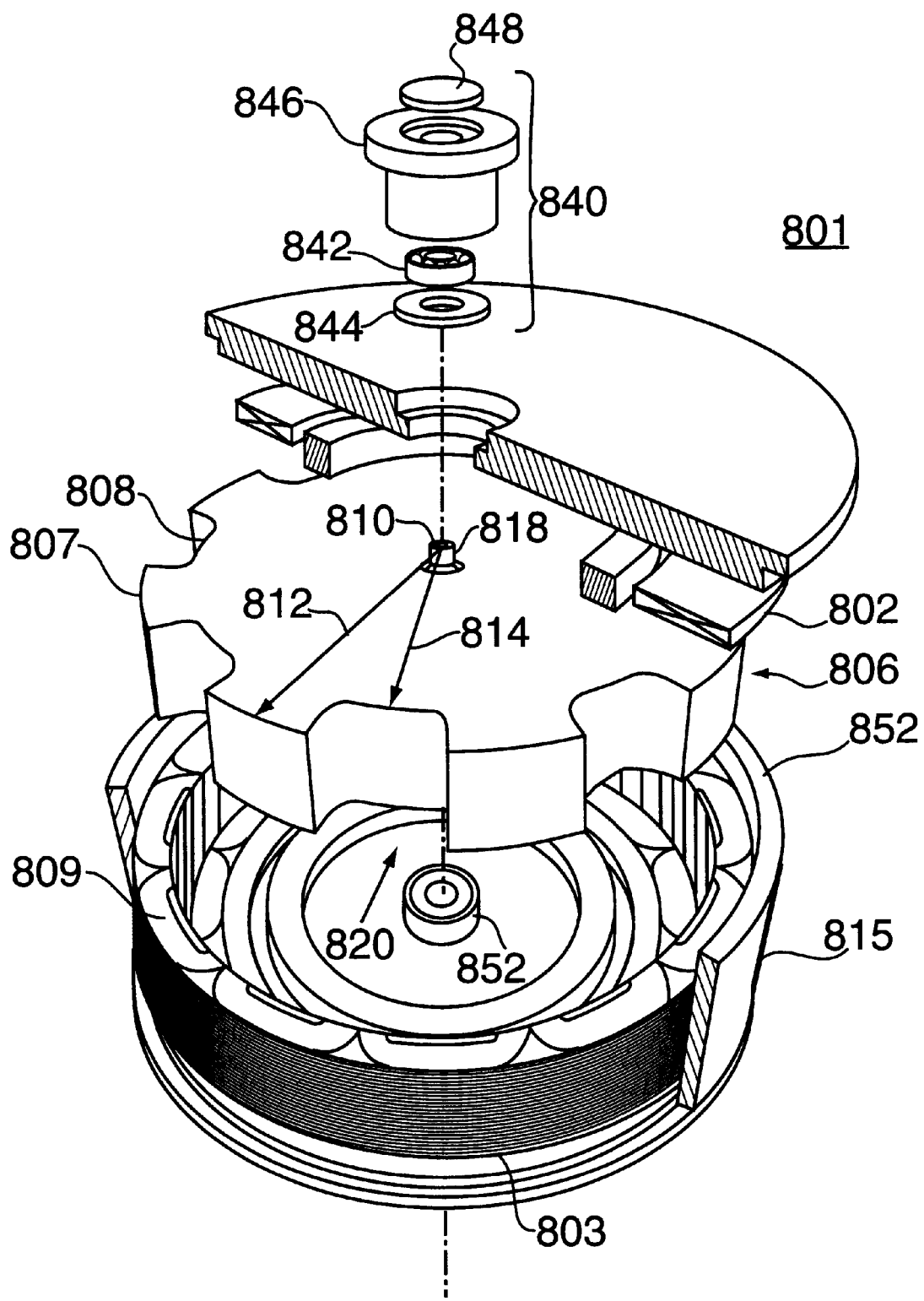
FIG. 8 is a cutaway perspective view of an alternate inductor-alternator in a partially disassembled state showing the geometry of the rotor in accordance with the principles of the present invention.

FIG. 8 shows an alternate inductor-alternator device 801 constructed in accordance with the principles of the present invention. Inductor-alternator 801 includes a stationary field coil 802 positioned above a smooth ring 803 (ring 803 may be formed from material such as laminated stacks of rings or arcs segments of high permeability material such as powdered iron or steel, alternatively, ring 803 may be formed from a solid high permeability material such as ferrite, or any other suitable material).

Ring 803 is similar to rings 503 and 504 in that ring 803 does not have inner surface axial slots for mounting the armature windings. As with armature coils 509, armature coils 809 are formed such that they may be mounted against ring 803. Armature coils 809 are preferably airgap coils that are formed of substantially low permeability material. While the inner surface of ring 803 is shown to be smooth and slotfree, and airgap armature coils are preferred, persons skilled in the art will appreciate that the inner surface of ring 803 may be slotted and that armature coils 809 may be wound within those slots without departing from the scope of the present invention. An outer shell 815 (or back iron) that is typically a substantially solid piece of steel surrounds the stator assembly and provides a flux return path as is described below.

Mounted within shell 815 is a rotor 806 that rotates freely about shaft 810. Rotor 806 is typically fabricated from a single cylinder of high-strength steel that is machined to form poles 807 extending radially from shaft 810. Rotor 806 is configured such that poles 807 are oriented to rotate within ring 803. While rotor 806 may be mounted within shell 815 in any manner, it may be preferred to mount rotor 806 within shell 815 utilizing a replaceable bearing cartridge 840 (containing bearing 842, bushing 844, bearing housing 846 and end cap 848). Inductor-alternator 801 is operated in a manner similar to those described above by applying a direct current to field coil 802.

Rotor 806, similar to rotor 506, provides high system inertia such that inductor-alternator 801 may be utilized for energy storage applications without requiring any additional components. Rotor 806 provides high system inertia due to its relative geometry. For example, similar to rotor 506, the gullet radius of rotor 806 (shown at arrow 814) is at least 75%, and preferrably at least 85%, of the maximum radius of rotor 806 (shown at arrow 812). Moreover, outer shafts 818 and 820 are less than one third the axial length of maximum radius 812. Outer shafts 818 and 820, in accordance with the present invention, may be even shorter than outer shafts 518 and 520 because the small rotor length to rotor diameter ratio of rotor &06 results in a device that incurs little or no bending dynamic modes. The geometry of rotor 806 results in a relatively high rotational inertia when compared to previously known inductor-alternator rotors.

Figure 9:
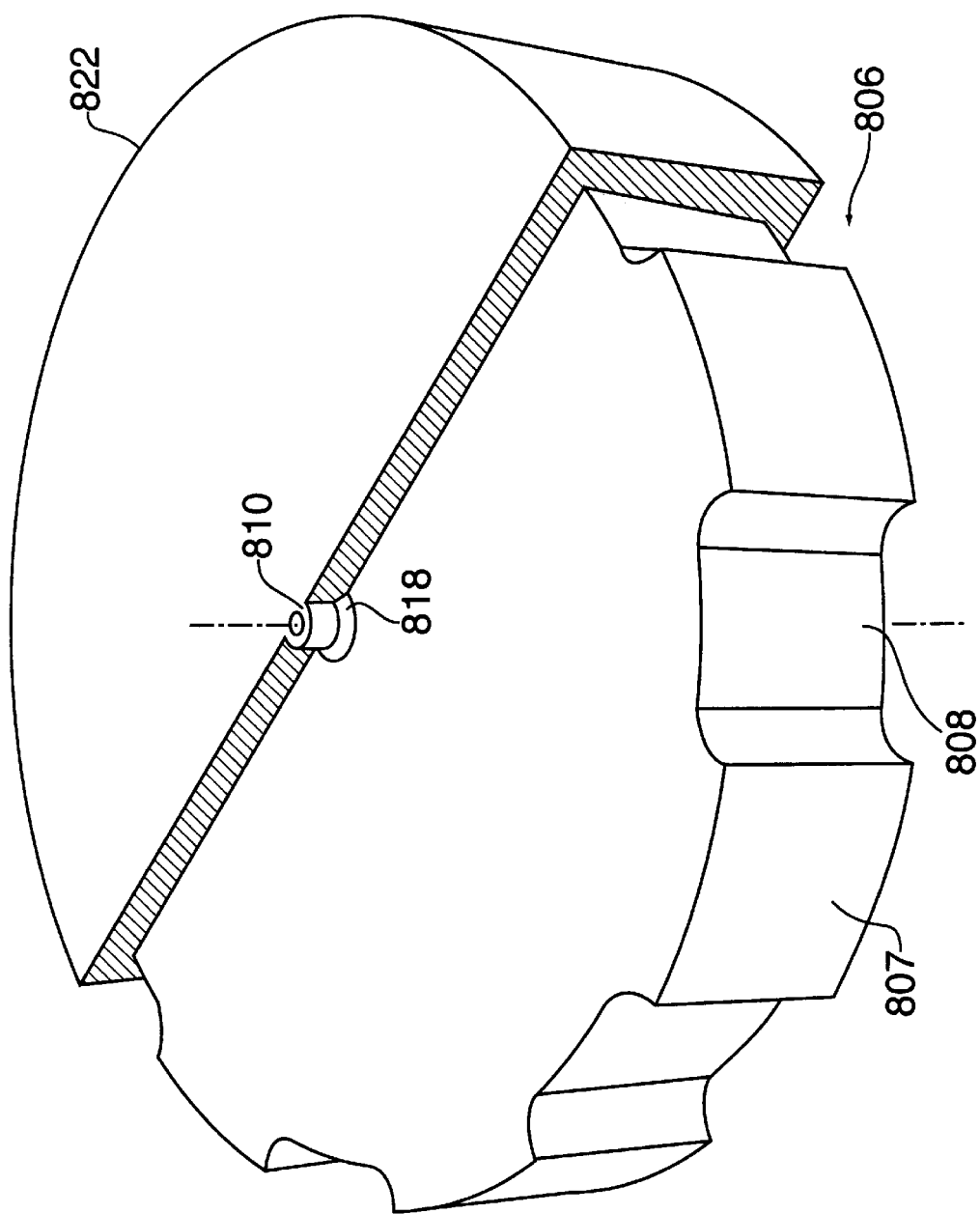
FIG. 9 is a cutaway perspective view of a rotor in the middle of machining for the inductor-alternator of FIG. 8 in accordance with the principles of the present invention.

Other advantages of the present invention are apparent from FIG. 9 that shows a rotor 806 in the middle of the fabrication process. As can been seen in FIG. 9, the overall geometry of rotor 806 requires that even less high-strength steel be machined away from cylinder blank 822 than was previously described with respect to rotor 506. For example, rotor 806 only has one set of rotor teeth to mill and does not require an inner shaft. Moreover, outer shafts 818 and 820 are significantly shorter than the shafts on conventional rotors so that they also require significantly less machining from cylindrical blank 822. The reduced machining requirements result in significantly lower manufacturing costs because of the small or low quantity of metal that must be milled.

It will be understood that the foregoing is only illustrative of the principles of the invention, and that various modifications can be made by those skilled in the art without departing from the scope and spirit of the invention.

We claim:

1. An inductor-alternator comprising:
   a rotatable member that may be rotated about an axis including:
   a high inertia rotor having a plurality of integral protrusions extending therefrom to a maximum radius, said rotor having a gullet radius between said protrusions that is at least 75% of said maximum radius, said rotor being constructed of solid steel; and
   a non-rotating member including:
   a member that generates homopolar flux, said flux creating magnetic poles in said protrusions;
   at least one ring having an inner surface, said ring being mounted concentric with respect to said rotor such that an armature air gap is formed between said protrusions and said inner surface, said ring being constructed of substantially high permeability material; and
   at least one armature coil mounted within said air gap such that said flux induces an AC voltage in said at least one armature coil when said rotor is rotated about said axis.

2. The inductor-alternator of claim 1, wherein said rotor has an integral shaft.

3. The inductor-alternator of claim 2, wherein said integral shaft includes a pair of outer shaft members, each having an axial length less than one third said maximum radius.

4. The inductor-alternator of claim 1, wherein said rotor is formed into three main sections:
   an upper section having a first portion of said plurality of integral protrusions;

a lower section having a second portion of said plurality of integral protrusions; and an inner axial portion between said upper and lower portions, said axial portion having a radius that is at least 75% of said maximum radius.

5. The inductor-alternator of claim 4, wherein said inner axial portion has a radius substantially equal to said maximum radius.

6. The inductor-alternator of claim 4, wherein said rotor has an integral shaft.

7. The inductor-alternator of claim 6, wherein said integral shaft includes first and second outer shaft members, each having an axial length less than one third said maximum radius, said first outer shaft member being integrally fixed to said upper section, said second outer shaft member being integrally fixed to said lower section.

8. The inductor-alternator of claim 6, wherein said flux generating member comprises at least one field coil mounted concentric with said inner axial portion that induces said flux to flow.

9. The inductor-alternator of claim 1, wherein said rotor includes an integral shaft, said apparatus further comprising:

a pair of upper and lower mechanical bearings that said shaft is rotatably mounted within; and an electromagnet mounted with respect to said rotor such that said electromagnet, when energized, removes a majority of the weight of said rotor from said mechanical bearings.

10. The inductor-alternator of claim 9, wherein said electromagnet acts directly upon said rotor to remove a majority of the weight of said rotor from said mechanical bearings.

11. The inductor-alternator of claim 1, wherein said flux generating member comprises at least one field coil that induces said flux to flow.

12. The inductor-alternator of claim 1, wherein each of said at least one armature coil is an airgap coil being formed of substantially low permeability material.

13. The inductor-alternator of claim 1, wherein said inner surface of said ring is a smooth, slotfree surface.

14. The inductor-alternator of claim 1, wherein said gullet radius between said protrusions is at least 85% of said maximum radius.

15. An inductor-alternator for converting between electrical and kinetic energy, said apparatus comprising:

a solid steel rotor having a plurality of integral protrusions extending therefrom to a maximum radius, said rotor having a gullet radius between said protrusions that is at least 75% of said maximum radius;

a member that generates homopolar flux, said rotor and said flux generating member forming a magnetic circuit while said rotor is rotated about an axis; and at least one stationary armature coil mounted such that said flux induces an AC voltage in said at least one armature coil when said rotor is rotated about said axis.

16. The inductor-alternator of claim 15, wherein said formed magnetic circuit has a total reluctance that remains substantially constant while said rotor is rotated about said axis.

17. The inductor-alternator of claim 15, wherein said rotor includes a pair of outer shaft mounting members, each having an axial length less than one third said maximum radius.

18. The inductor-alternator of claim 15, wherein said rotor is formed into three main sections:

an upper section having a first portion of said plurality of integral protrusions;

a lower section having a second portion of said plurality of integral protrusions; and an inner axial portion between said upper and lower portions, said axial portion having a radius that is at least 75% of said maximum radius.

19. The inductor-alternator of claim 18, wherein said inner axial portion has a radius substantially equal to said maximum radius.

20. The inductor-alternator of claim 15, wherein said rotor includes an integral shaft that said rotor is rotated about, said apparatus further comprising:

a pair of upper and lower mechanical bearings that said shaft is rotatably mounted within; and an electromagnet mounted with respect to said rotor such that said electromagnet, when energized, removes a majority of the weight of said rotor from said mechanical bearings.

21. The inductor-alternator of claim 20, wherein said electromagnet acts directly upon said rotor to remove a majority of the weight of said rotor from said mechanical bearings.

22. The inductor-alternator of claim 15, wherein said flux generating member comprises at least one field coil that induces said flux to flow.

23. The inductor-alternator of claim 15, wherein each of said at least one armature coil is an airgap coil being formed of substantially low permeability material.

24. The inductor-alternator of claim 15, further comprising at least one ring having an inner surface, said ring being mounted concentric with respect to said rotor such that an armature air gap is formed between said protrusions and said inner surface, said ring being constructed of substantially high permeability material.

25. The inductor-alternator of claim 24, wherein said inner surface of said ring is a smooth, slotfree surface.

26. The inductor-alternator of claim 15, wherein said gullet radius between said protrusions is at least 85% of said maximum radius.

27. An inductor-alternator comprising:

a rotatable member that may be rotated about an axis including:

a high inertia solid steel rotor having a first and a second plurality of integral protrusions extending therefrom to a maximum radius, said rotor having a gullet radius between said protrusions that is at least 75% of said maximum radius, said first and second pluralities of protrusions being separated by an inner shaft portion having a radius that is at least 75% of said maximum radius; and a non-rotating member including:

a member that generates homopolar flux, said flux creating magnetic poles in said protrusions, said member being mounted concentric with said inner shaft portion;

a first ring having a first inner surface, said first ring being mounted concentric with respect to said rotor such that a first armature air gap is formed between said first plurality of protrusions and said first inner surface, said first ring being constructed of substantially high permeability material;

a second ring having a second inner surface, said second ring being mounted concentric with respect to said rotor such that a second armature air gap is formed between said second plurality of protrusions and said second inner surface, said second ring being constructed of substantially high permeability material; and at least one armature coil mounted within each of said first and second armature air gaps such that said flux induces an AC voltage in said armature coils when said rotor is rotated about said axis.

28. An inductor-alternator comprising:

a rotatable member that may be rotated about an axis including:
   a high inertia solid steel rotor having a first and a second plurality of integral protrusions extending therefrom to a maximum radius, said first and second pluralities of protrusions being separated by an inner shaft portion having a radius that is at least 75% of said maximum radius; and a non-rotating member including:
   a member that generates homopolar flux, said flux creating magnetic poles in said protrusions, said member being mounted concentric with said inner shaft portion;
   a first ring having a first inner surface, said first ring being mounted concentric with respect to said rotor such that a first armature air gap is formed between said first plurality of protrusions and said first inner surface, said first ring being constructed of substantially high permeability material;
   a second ring having a second inner surface, said second ring being mounted concentric with respect to said rotor such that a second armature air gap is formed between said second plurality of protrusions and said second inner surface, said second ring being constructed of substantially high permeability material; and
   at least one armature coil mounted within each of said first and second armature air gaps such that said flux induces an AC voltage in said armature coils when said rotor is rotated about said axis.

* * * * *